Patented June 15, 1943

2,321,967

UNITED STATES PATENT OFFICE 2,321,967

DEWAXING SOLVENT

Erving Arundale, Colonia, N. J., assignor to Standard Oil Development Company, a corporation of Delaware No Drawing. Application December 21, 1940, Serial No. 371,111

6 Claims. (Cl. 196—18)

The present invention relates to the refining of mineral oils. The invention is more particularly concerned with an improved method for separating waxy constituents from wax-bearing petroleum oils in order to produce dewaxed oils having a low cold test. The method of this invention involves the utilization of an improved dewaxing solvent selected from the class of dioxolanes.

It is well known in the art to separate waxy constituents from wax-bearing mineral oils by various methods, all of which have in common the feature of solidifying the waxy constituents by cooling the wax-containing oil to relatively low temperatures. The separation of solid, precipitated waxy constituents from the chilled oil is effected by allowing the precipitated wax to settle by gravity and decanting the wax-free oil therefrom, or by filtering the oil-wax slurry either in the usual plate and frame presses or drum filters or by means of a centrifugal or equivalent filter. It is also known in the art to facilitate and accelerate the separation of the wax from the wax-bearing oils by utilizing various materials as dewaxing solvents and so-called settling or dewaxing aids. The dewaxing solvents conventionally used are selected from a wide variety of substances. For example, it is known to use light naphthas, propane, pentane, hexane, heptane, and the like, as well as various aromatic hydrocarbons, acetates, ketones, alcohols, chlorinated hydrocarbons, etc., as dewaxing solvents. An ideal solvent for employment in a dewaxing operation is one in which the waxy constituents are substantially insoluble at dewaxing temperatures and with which the wax-free oil is miscible at very low temperatures. It is also desirable that the solvent permit the use of relatively high filtering rates at low temperatures in order that the operation be commercially feasible. A suitable solvent, furthermore, must be a substance which is readily separable and recoverable from the dewaxed oil and which is stable under the conditions employed in the dewaxing operation and in the recovery operation. Very few solvents or solvent mixtures possess all of these characteristics to the desired degree.

I have, however, now discovered a class of substances which, when utilized in operations for the removal of waxy constituents from wax-bearing oils, produce unexpectedly desirable results. These solvents are selected from the class of dioxolanes and are characterized by having the following structural formula:

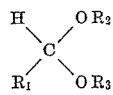

in which $R_1$ represents a hydrogen atom or an alkyl group and $R_2$ and $R_3$ together represent an alkylene radical (a bivalent hydrocarbon radical in which the free valance bonds are on adjacent carbon atoms, e. g.,

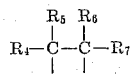

where $R_4$, $R_5$, $R_6$ and $R_7$ are alkyl radicals or hydrogen atoms). Solvents of this character are, for example the following and similar dioxolanes:

$$\begin{array}{c} CH_2\text{---}CH_2 \\ | \quad\quad | \\ O \quad\quad O \\ \diagdown H \diagup \\ C \\ | \\ CH_3 \end{array}$$

$$\begin{array}{c} CH_3 \\ \diagdown \\ H\text{--}C\text{-----}CH_2 \\ | \quad\quad\quad | \\ O \quad\quad\quad O \\ \diagdown \diagup \\ CH_2 \end{array}$$

$$\begin{array}{c} CH_3 \\ | \\ CH_3\text{--}C\text{-----}CH_2 \\ | \quad\quad\quad | \\ O \quad\quad\quad O \\ \diagdown H \diagup \\ C \\ | \\ CH(CH_3)_2 \end{array}$$

One of the major factors influencing the suitability of a material for use as a dewaxing solvent is the relative solubility therein of waxy constituents and low pour point oily fractions. As previously stated, the ideal dewaxing solvent is one in which the waxy fractions are relatively insoluble and with which the oil constituents are completely miscible at the relatively low temperatures necessarily employed in the dewaxing operation. Low wax solubility in the dewaxing solvent is desired as this factor determines the spread between the temperature at which the dewaxing operation is carried out and the pour point of a dewaxed oil. Complete miscibility between the solvent and the oil constituents is necessary in order to secure a satisfactory separation of the wax crystals from the dewaxed solutions.

The solvents of the present invention, because of their low miscibility temperature, can advantageously be employed at low dewaxing temperatures.

The dioxolanes of the present invention may be used in conjunction with conventional dewaxing solvents, such as naphthas, benzene, ketones, esters, chlorinated hydrocarbons and the like. A particularly desirable dewaxing solvent mixture comprises a mixture of a solvent of the present invention and methyl ethyl ketone.

The solvents of this invention may be employed in dewaxing operations for the removal of waxy constituents from any mineral oil. They are suitable for use in dewaxing operations conducted over a wide range of temperature and pressure conditions. However, in general, the dewaxing operations in which the present solvents are used are entirely similar to the conventional dewaxing operations. In these operations, the solvent is added to the waxy oil and the mixture is then chilled to a temperature in the range between about $+30°$ F. and $-30°$ F., the exact temperature chosen depending upon the character of the crystallized wax to be removed and the pour point desired in the dewaxed oil. The crystallized wax is separated from the oil either by filtration or by centrifuging, while the solvent is removed from the separated wax constituents and from the dewaxed oil fractions by distillation.

The amount of dewaxing solvent employed may vary widely and depends upon the particular oil being dewaxed, the solvent employed, and the characteristics desired in the dewaxed oil. In general, it is preferred to employ from about one to four volumes of dewaxing solvent per volume of oil being dewaxed.

From the above, it is apparent that the dewaxing solvents of the present invention possess considerable merit over the solvents conventionally employed.

The process of the present invention is not to be limited by any theory or mode of operation but only in and by the following claims in which it is desired to claim all novelty in so far as the prior art permits.

I claim:

1. Process for the removal of waxy constituents from an oil containing the same which comprises mixing with the oil a quantity of dioxolane, chilling the mixture to a temperature at which the waxy constituents precipitate, separating the precipitated waxy constituents from the dewaxed oil, and removing the dioxolane therefrom.

2. Process for the removal of waxy constituents from an oil containing the same which comprises mixing with the oil a quantity of a dioxolane solvent selected from the class of substances which are characterized by having the following structural formula:

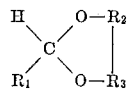

in which $R_1$ represents an alkyl group or hydrogen, and $R_2$ and $R_3$ represent alkyl groups, chilling the mixture to a temperature at which the waxy constituents precipitate, separating the precipitated waxy constituents from the dewaxed oil, and removing the solvent therefrom.

3. Process as defined in claim 2 in which the alkyl group present in the molecules of the dewaxing solvent contains from one to five carbon atoms.

4. Process as defined by claim 2 in which said solvent has the following structure:

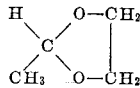

5. Process as defined by claim 2 in which said solvent has the following structure:

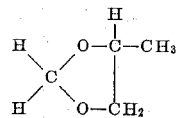

6. Process as defined by claim 2 in which said solvent has the following structure:

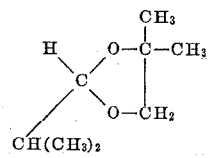

ERVING ARUNDALE.